United States Patent [19]

Crouch

[11] Patent Number: 4,984,135
[45] Date of Patent: Jan. 8, 1991

[54] INTERCHANGEABLE CAMERA LIGHT MOUNT

[75] Inventor: Jeffrey P. Crouch, Terryville, Conn.

[73] Assignee: Anton/Bauer, Inc., Shelton, Conn.

[21] Appl. No.: 502,459

[22] Filed: Mar. 30, 1990

[51] Int. Cl.$^5$ ............................................. G03B 15/02
[52] U.S. Cl. ......................................... 362/8; 362/368
[58] Field of Search ..................... 362/3, 8, 226, 368, 362/11; 354/145.1, 295

[56] References Cited

U.S. PATENT DOCUMENTS

| | | | |
|---|---|---|---|
| 3,154,361 | 10/1964 | Franke et al. | 362/8 X |
| 3,508,481 | 4/1970 | Hankins | 362/8 X |
| 3,527,437 | 9/1970 | Lippmin | 362/8 X |
| 4,291,967 | 9/1981 | Jackson, Jr. | 362/8 X |
| 4,425,531 | 1/1984 | Holmes | 362/8 X |
| 4,591,250 | 5/1986 | Woodruff | 354/295 X |

FOREIGN PATENT DOCUMENTS 2123539  2/1984  United Kingdom .................... 362/3

*Primary Examiner*—Stephen F. Husar
*Assistant Examiner*—Peggy Neils
*Attorney, Agent, or Firm*—Kramer, Brufsky & Cifelli

[57] ABSTRACT

An interchangeable mount for a light housing or module adapted to be mounted on a video or film camera or other support surface includes interchangeable shafts, one of which is affixed to a thumbwheel rotatably mounted in the light housing. Should the camera be provided for the receipt of a threaded fastener to mount the light housing on the camera, the shaft received and fixed to the thumbwheel can have an integral, depending threaded connecting element received in the threaded bore in the camera to mount the housing, upon rotation of the thumbwheel. Should the camera be provided with a U-shaped clip in cross-section or "shoe" for mounting the light module, the shaft may include a threaded fastener or screw having an elongated head depending and threadably connected to the bottom of the shaft fixed to the thumbscrew. The enlarged head of the depending threaded connector element may then be slid within one end of the U-shaped clip in cross-section and the thumbwheel rotated to draw the head of the threaded connector element into clamping engagement with parallel rails of the U-shaped clip or "shoe".

11 Claims, 2 Drawing Sheets

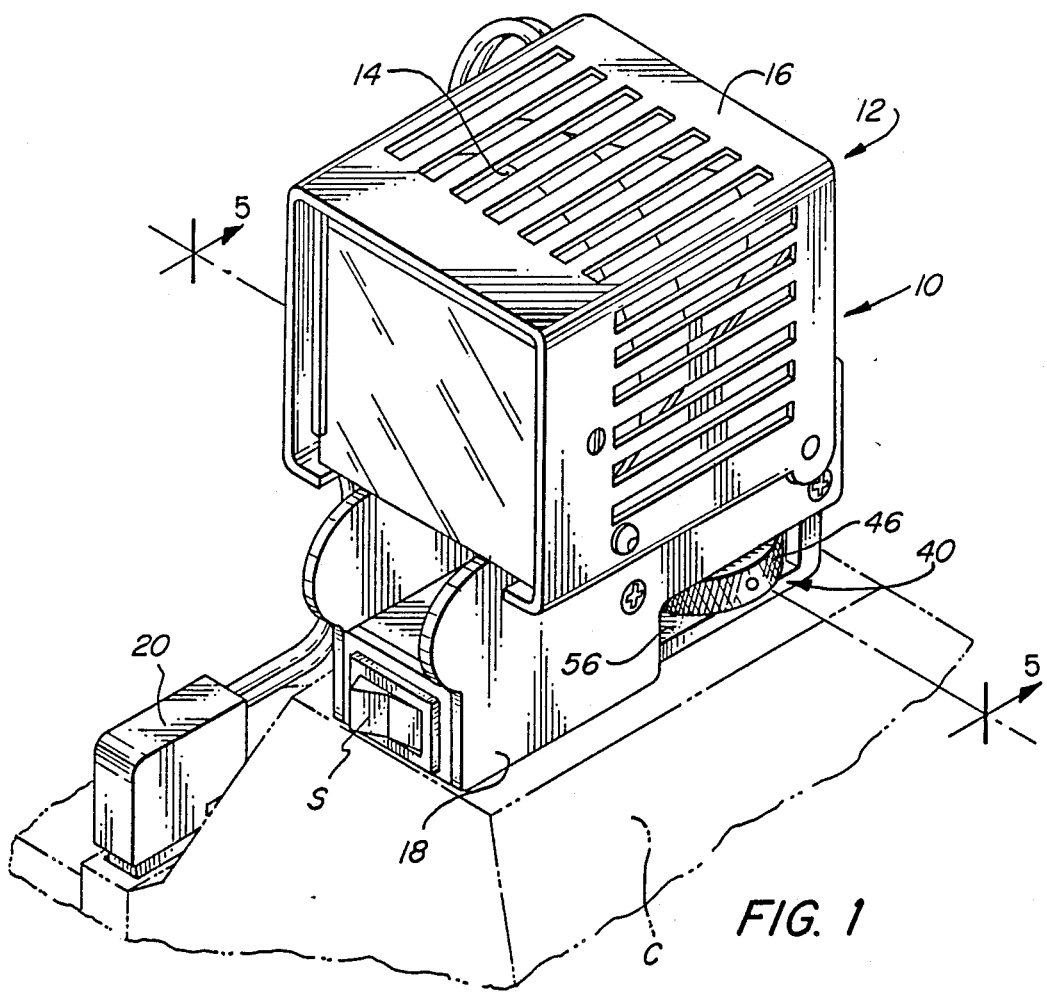
FIG. 1
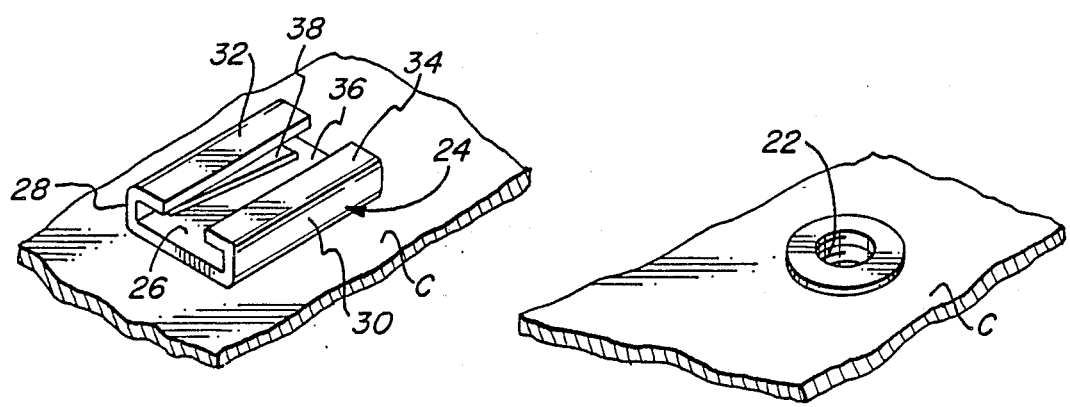
FIG. 3
FIG. 2

INTERCHANGEABLE CAMERA LIGHT MOUNT

BACKGROUND OF THE INVENTION

1. Field of the Invention

This invention relates to a mount for a light housing on a portable camera, such as a video or film camera, and more particularly, an interchangeable mount for supporting the light housing in a threaded bore or on an elongated clip provided by the camera manufacturer on the camera housing.

2. Description of the Prior Art

At present there are a variety of light assemblies that can be mounted on a portable video or film camera.

One such portable light assembly is illustrated in U.S. Pat. No. 4,554,621, dated Nov. 19, 1985, issued to John J. Corrigan and assigned to the assignee of the present invention. Such light assembly includes a light housing mounted on a post fixed to the camera housing. The post is received in a bore in the light housing and a thumbscrew on the light housing can be rotated to clamp the post in the bore.

Other cameras are provided with a threaded bore for threadably receiving a threaded fastener depending from the light housing or module. An electrical connector attached to the light module in series with a lamp bulb in the light module connects the bulb to a power source, such as a portable battery, mounted on the camera. Other light module mounts include a U-shaped in cross-section clip, commonly referred as a "shoe" mounted on the camera, slidably receiving in frictional engagement a post having an enlarged head depending from the light module.

It has heretofore been common to provide interchangeable posts received within the bore of the light housing illustrated U.S. Pat. 4,554,621 in order to adapt the housing or module for mounting on a camera having a threaded bore or a U-shaped clip mount. The post would be received in the bore of the housing and tightened by means of a thumbscrew. Depending from the post is a threaded fastener for connection in the threaded bore provided by the camera manufacturer for mounting of the light housing or alternatively, the end of the post is provided with an enlarged head adapted to be slidably received through an end of the U-shaped clip or "shoe" provided by the camera manufacturer to mount the portable light module. The clip is usually provided with an internal leaf spring to seat and frictionally engage the enlarged head.

However, the posts are heavy and bulky. Because of their bulk and weight and the added height at which the light is mounted, the use of these mounts is somewhat burdensome and camera users would be loathe to carry them with them. Furthermore, ready access to the thumbscrew for tightening and loosening the post connection to the light module or housing enabled easy and often accidental disengagement of the post from the housing, which could result in damage to the light module on the camera.

SUMMARY OF THE INVENTION

This invention provides an interchangeable mount for a light housing or module adapted to be mounted on a video or film camera. The mount includes interchangeable shafts, one of which is affixed to a thumbwheel rotatably mounted in the light housing.

The thumbwheel is accessible through a window in the housing whose width is less than the diameter of the thumbwheel, whereby accidental rotation and disassociation of the thumbwheel and housing is minimized. An Allen-head screw inserted in the peripheral circumference of the thumbwheel is used to fix the interchangeable shaft to the thumbwheel. Because of the Allen-head fastener connecting the thumbwheel to the shaft, the shaft cannot be disassociated from the thumbwheel without external tools, such as an Allen-head wrench; but, intentional disassociation can be readily and easily accomplished to interchange the different shafts depending on the camera mounting mechanism.

For example, should the camera be provided for the receipt of a threaded fastener to mount the light housing on the camera, the shaft received and fixed to the thumbwheel can have a integral, depending threaded connecting element received in the threaded bore in the camera to mount the housing. Should the camera be provided with a U-shaped clip in cross-section or "shoe" for mounting the light module, the shaft may include a threaded fastener or screw having an enlarged head depending and threadably connected to the bottom of the shaft fixed to the thumbscrew by the Allen-head fastener. The enlarged head of the depending threaded connector element may then be slid within one end of the U-shaped clip and the thumbwheel rotated to draw the head of the threaded connector element into clamping engagement with spaced rails parallel to the bight of the U-shaped clip or "shoe".

The shaft, in any case, is adapted to seat substantially flush with the bottom of the light housing and is fixed to the housing as a permanent part thereof for ready connection of the light module to the camera. Yet, this permanent fixture may be readily interchanged by supplying a different type of shaft should it become necessary to adapt the light module for mounting to a different camera mounting means. The interchangeable shafts may be removed and replaced with a minimum of effort but may not be casually or accidentally loosened or dislodged from the light housing.

BRIEF DESCRIPTION OF THE DRAWINGS

Further objects and advantages of the invention will become apparent from the following description and claims, and from the accompanying drawings, wherein:

FIG. 1 is a perspective view of a light housing provided with the interchangeable mount of the present invention mounted on a camera housing;

FIG. 2 is a partial perspective view of the camera housing of FIG. 1 with the light housing removed, showing the means for mounting the light housing;

FIG. 3 is a view similar to FIG. 2, but illustrating a different means for mounting the light housing;

DETAILED DESCRIPTION OF THE PREFERRED EMBODIMENT

Figure 4:
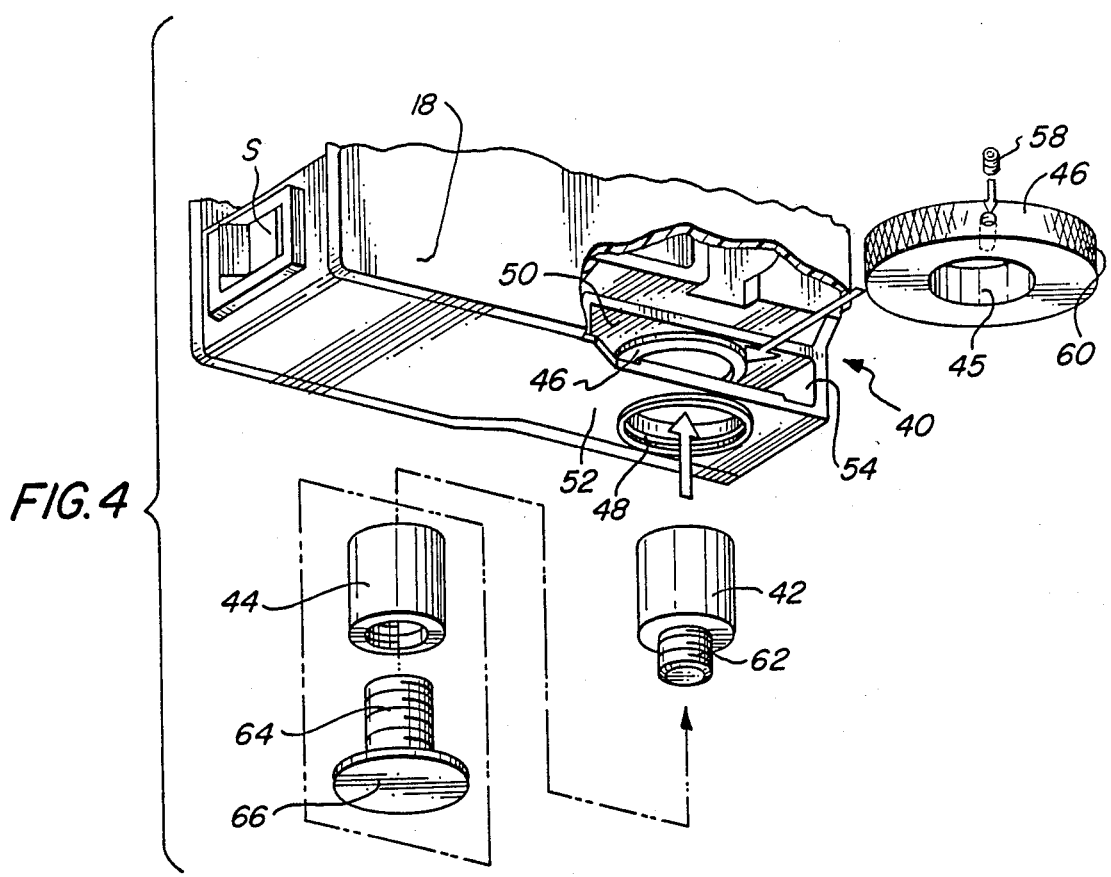
FIG. 4 is an exploded perspective view of the bottom of the light housing of FIG. 1 with alternative interchangeable shafts illustrated for mounting the light housing on the camera mounting means of either FIGS. 2 or 3.

Referring now to the drawings in detail, wherein like numerals indicate like elements throughout the several views, a light housing assembly mounted on a video or film camera is generally illustrated in FIG. 1 by the numeral 10.

The light housing assembly 10 does not form a part of the present invention, per se, and is described in detail in U.S. Pat. No. 4,554,621. Generally, the light housing assembly 10 includes a light module 12 adapted to mount a lamp 14 in a housing 16. The housing 16 has a base 18 adapted to be removably mounted on a film or video camera C and an electrical connector 20 connected to a battery or other power source on camera C to provide power to light the lamp 14 in housing 16. The base 18 of housing 16 is adapted to be mounted in either a threaded bore 22 on the camera C (FIG. 2), or a U-shaped in cross-section clip 24, commonly referred to as a "shoe" (FIG. 3) fixed to the camera C. The clip 24 has an entrance 26 defined between opposed upright legs 28, 30 and beneath parallel rails 32, 34 connected to legs 28, 30, respectively, and overlying the bight 36 of the clip 24. A leaf-spring clip 38 is fixed at one end to the inner surface of one or both of the legs 32, 34.

The base 18 of housing 16 is provided with an interchangeable mount, generally designated by the numeral 40 for mounting the light housing assembly 10 on camera C in either threaded bore 22 or on clip 24. The mount 40 includes interchangeable shafts, 42, 44, one of which is affixed to a thumbwheel 46. The thumbwheel 46 has a diameter less than the width of a compartment 54 and is freely rotatably mounted in base 18 between a pair of spaced bushings 46, 48 provided in the roof 50 and floor 52, respectively, forming the substantially square-shaped compartment 54 in the rear of the base 18.

The thumbwheel 46 is accessible through a window 56 of compartment 54. The width of window 56 is less than the diameter of the thumbwheel in base 18, whereby accidental rotation and disassociation of the thumbwheel 46 from the base 18 of housing 16 is minimized. An Allen-head screw 58 inserted in the peripheral knurled circumference 60 of the thumbwheel is used to fix one of the two interchangeable shafts 42, 44 inserted in a bore 25 of thumbwheel 26. Because of the Allen-head fastener 58 connecting the thumbwheel 26 to the shaft 42 or 44, the shaft 42 or 44 cannot be disassociated from the thumbwheel 26 without external tools, such as an Allen-head wrench; but, intentional disassociation can be readily and easily accomplished to interchange one of the two different shafts 42, 44 depending on the camera mounting mechanism 22 or 24 on camera C.

Figure 5:
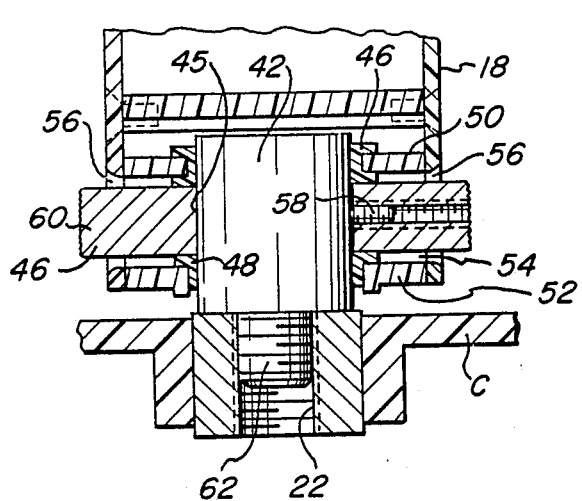
FIG. 5 is a cross-sectional view taken substantially along the plane indicated by line 5—5 of FIG. 1, illustrating the connection of the interchangeable mount on the light housing to the camera mounting means of FIG. 2.
Figure 6:
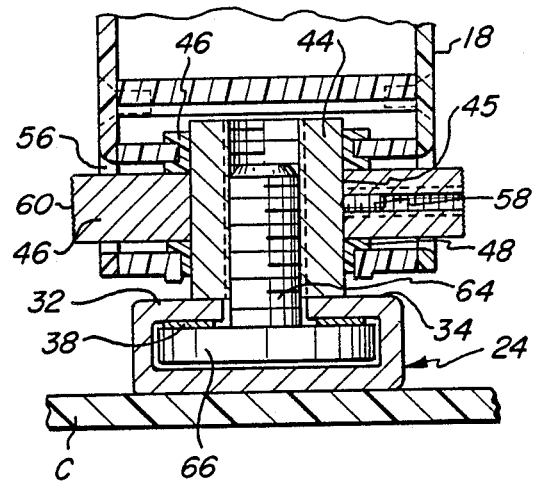
FIG. 6 is a cross-sectional view similar to FIG. 5, but illustrating the connection of the interchangeable mount on the light housing to the camera mounting means of FIG. 3.

For example, should the camera C be provided for the receipt of a threaded fastener in a bore 22 to mount the light housing on the camera, the shaft 42 received and fixed to the thumbwheel 26 can have an integral, depending, threaded connecting element 62 received in the threaded bore 22 in the camera C to mount the housing 16, as shown in FIG. 5. Rotation of thumbwheel 26 threads fastener 62 into bore 22. Should the camera C be provided with a U-shaped cross-section clip 24 or "shoe" for mounting the light housing 16, the shaft may include a threaded fastener or screw 64 having an enlarged head 66 depending and threadably connected to the bottom of the shaft 44 fixed to the thumbscrew 46 by the Allen-head fastener 58. The enlarged head 66 of the depending threaded connector element 64 may then be slid within one end or through the entrance 26 of the U-shaped clip 24 and the thumbwheel rotated to draw the head of the threaded connector element into clamping engagement with the leaf spring 38 and parallel rails 32, 34 of the U-shaped clip 24 or "shoe", as shown in FIG. 6.

The shaft, 42 or 44 in either case, is adapted to seat substantially flush with the bottom 52 of the base 18 of light housing assembly 10 and is fixed to the housing as a permanent part thereof for ready connection of the light module 12 to the camera C. Yet, the permanent fixture may be readily interchanged by supplying a different type, or one of shafts 42, 44 should it become necessary to adapt the light housing 16 for mounting to a different one of camera mounting means 22, 24. The interchangeable shafts 42, 44 may be removed and replaced with a minimum of effort but may not be casually or accidentally dislodged from the light housing assembly 10.

While the interchangeable mount 40 of the present invention is illustrated as mounting a light housing to the camera C, it should be understood that the mount 40 can be utilized with the base 18 of any other camera accessory. In addition, the mount of the present invention can be used to mount a light housing on a tripod, stand or other camera accessory for holding the light, rather than the camera itself.

What is claimed is:

1. Mounting means for connecting a portable light or the like to a camera provided with a threaded mounting bore, said mounting means comprising:
    a housing for said portable light or the like provided with an enclosed compartment having at least one laterally extending window;
    a thumbwheel rotatably mounted in said housing compartment having a diameter greater than the major dimension of said window;
    said thumbwheel being provided with an accessible portion exterior of said window of said housing for enabling contact and rotation thereof;
    a shaft removably connection to said thumbwheel within said housing;
    said shaft including a threaded fastener depending from the bottom thereof; and
    means on the perimeter of said thumbwheel for securing said shaft to said thumbwheel for rotation therewith;
    whereupon rotation of said thumbwheel will rotate said shaft and depending threaded fastener so that said housing can be threadedly connected to said camera by inserting said depending threaded fastener on said shaft into the threaded bore in said camera.

2. Mounting means in accordance with claim 1 wherein said thumbwheel has a bore receiving said shaft, and
    said means for securing said shaft in said thumbwheel includes:

3. Mounting means in accordance with claim 1 wherein said shaft is inserted substantially wholly within said housing except for its depending threaded fastener.

4. Mounting means for connecting a portable light or the like to a camera provided with a clip having a U-shaped cross-section and at least one open end defined by a pair of parallel rails spaced from the bottom of the clip, said mounting means comprising:
- a housing for said portable light or the like provided with an enclosed compartment having at least one laterally extending window;
- a thumbwheel rotatably mounted in said housing compartment having a diameter greater than the major dimension of said window;
- said thumbwheel being provided with an accessible portion exterior of said window of said housing for enabling contact and rotation thereof;
- a shaft removably connected to said thumbwheel within said housing;
- said shaft including a threaded fastener threadably mounted thereon and having an enlarged head adapted to be received through the entrance in said U-shaped clip on said camera into frictional engagement with the parallel rails; and
- means on the perimeter of said thumbwheel for securing said shaft to said thumbwheel for rotation therewith;
- whereupon rotation of said thumbwheel will draw said enlarged head into clamping engagement with the rails of said clip between the bottom of said shaft and said enlarged head of said threaded fastener.

5. Mounting means in accordance with claim 4 wherein said thumbwheel having a bore receiving said shaft, and
- said means for securing said shaft in said thumbwheel includes:
- a screw inserted through the perimeter of said thumbwheel into contact with said shaft in said thumbwheel bore.

6. Mounting means in accordance with claim 4 wherein said shaft is inserted substantially wholly within said housing except for the threaded fastener mounted thereon.

7. Interchangeable mounting means for connecting a portable light or the like to a camera or other support surface provided with a threaded mounting clip having at least one open end defined by a pair of parallel rails spaced from the bottom of the clip, said mounting means comprising:
- a housing for said portable light or the like;
- a thumbwheel rotatably mounted in said housing and provided with an accessible portion exterior of said housing for enabling contact and rotation thereof;
- interchangeable shafts adapted to be removably connected to said thumbwheel within said housing;
- means on the perimeter of said thumbwheel for securing each of said shafts to said thumbwheel for rotation therewith;
- one of said shafts including a threaded fastener depending from the bottom thereof adapted to be connected to the threaded mounting bore of a camera;
- whereupon rotation of said thumbwheel will rotate said shaft and depending threaded fastener so that said housing can be threadedly connected to said camera by inserting said depending threaded fastener on said shaft into the threaded bore in said camera; and
- another of said shafts including a threaded fastener threadably mounted thereon and having an enlarged head adapted to be received through the entrance in a U-shaped clip on a camera;
- whereupon rotation of said thumbwheel will draw said enlarged head into clamping engagement with the rails of said clip between the bottom of said shaft and said enlarged head of said threaded fastener.

8. Interchangeable mounting means in accordance with claim 7 wherein said thumbwheel has a bore for receiving said shafts; and
- said means for securing each of said shafts to said thumbwheel includes:
- a screw inserted through the perimeter of said thumbwheel into contact with a shaft inserted in said thumbwheel bore.

9. Interchangeable mounting means in accordance with claim 8 wherein the accessible portion of said thumbwheel extends through a window on said housing.

10. Interchangeable mounting means in accordance with claim 9 wherein the diameter of said thumbwheel is greater than the width of said window on said housing.

11. Interchangeable mounting means for connecting a portable light or the like to a camera or other support surface, said mounting means comprising:
- a housing for said portable light or the like;
- a thumbwheel rotatably mounted and enclosed within said housing and provided with an accessible portion exterior of said housing for enabling contact and rotation thereof;
- interchangeable shafts adapted to be removably connected to said thumbwheel within said housing; and
- means on the perimeter of said thumbwheel for securing one of said shafts to said thumbwheel for rotation therewith;
- each of said shafts including means depending from the bottom thereof for attachment to a camera or other support surface in response to rotation of said thumbwheel.

* * * * *